United States Patent
Zoller et al.

(10) Patent No.: US 8,247,924 B1
(45) Date of Patent: Aug. 21, 2012

(54) POWER SUPPLY AND METHOD THAT MAINTAINS SUPPLY VOLTAGE IN COMMUNICATIONS SYSTEMS DURING A POWER SUPPLY INTERRUPTION

(75) Inventors: Jeremy Zoller, New Market, AL (US); Steven Robinson, Madison, AL (US); Peter Campbell, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 357 days.

(21) Appl. No.: 12/651,589

(22) Filed: Jan. 4, 2010

(51) Int. Cl.
*H02J 9/00* (2006.01)
*H02J 3/10* (2006.01)
*H04J 3/00* (2006.01)

(52) U.S. Cl. .................. 307/80; 307/64; 307/82

(58) Field of Classification Search .............. 307/82, 307/80, 64, 48
See application file for complete search history.

(56) References Cited

U.S. PATENT DOCUMENTS

| | | | |
|---|---|---|---|
| 6,437,574 B1 | 8/2002 | Robinson et al. | 324/426 |
| 6,606,383 B1 | 8/2003 | Robinson et al. | 379/413 |
| 6,665,404 B2 * | 12/2003 | Cohen | 379/413 |
| 6,693,810 B2 | 2/2004 | Robinson et al. | 363/97 |
| 7,098,557 B2 | 8/2006 | Swanson et al. | 307/66 |
| 7,302,352 B2 | 11/2007 | Chuang | 702/58 |
| 7,355,303 B2 | 4/2008 | Swanson et al. | 307/66 |
| 7,940,118 B1 * | 5/2011 | Forghani-Zadeh et al. | 327/536 |
| 2008/0046768 A1 | 2/2008 | Chuang | 713/300 |

* cited by examiner

*Primary Examiner* — Michael Rutland Wallis
(74) *Attorney, Agent, or Firm* — Allen, Dyer, Doppelt, Milbrath & Gilchrist, P.A.

(57) ABSTRACT

A power supply and associated method include a power supply converter having a power output and configured to provide a supply voltage through the power output to a communications device. A simplified boost circuit is connected to the power supply converter in parallel but isolated from the power supply converter's bulk input capacitance during normal operation. The boost circuit includes at least one power storage circuit and a charging circuit connected thereto and configured to charge and maintain the power storage circuit to a predetermined voltage and switch the power storage circuit into the power supply converter during an undervoltage condition to transfer the stored power from the power storage circuit to the power supply converter and maintain the supply voltage to the communications device connected thereto for a required hold-up time.

17 Claims, 2 Drawing Sheets

POWER SUPPLY AND METHOD THAT MAINTAINS SUPPLY VOLTAGE IN COMMUNICATIONS SYSTEMS DURING A POWER SUPPLY INTERRUPTION

FIELD OF THE INVENTION

The present invention relates to power supplies, and more particularly, the present invention relates to power supplies and methods that maintain power during a power interruption for a required hold-up time.

BACKGROUND OF THE INVENTION

Some communications network devices are required either by government or network regulations or protocols to remain fully powered during undervoltage or power outage conditions for a time period that depends on the product and application. This length of time can be 2 ms to 25 ms in some applications, but can be as high as 50 ms in other applications. Conventional circuit solutions add bulk input capacitance to prolong the time between when power is lost and when the minimum operating voltage threshold is reached by reducing the input voltage slew rate. For some applications, however, this approach is impractical.

As power demands and hold-up times increase and minimum operating input voltages decrease, the input capacitance required to satisfy these constraints becomes so large that the capacitors consume more printed circuit board (PCB) area than is practical or even available. One known telecommunications device is required to hold up to 20 watts of power for 24 milliseconds at a minimum specified operating voltage of 20V and an undervoltage shutoff threshold at 18V. To meet these requirements would require 0.013 Farads worth of capacitance, which would not be practical from both a cost and PCB area standpoint.

There are other hold-up circuits that address these issues and are generally known for boosting input voltage. These known hold-up circuits rely on their own boost power supply controllers, however. Other circuits support a "dying gasp" signal, for example, circuitry disclosed in U.S. Pat. No. 7,302,352; U.S. Patent Publication No. 2008/0046768; and U.S. Pat. Nos. 7,098,557 and 7,355,303.

SUMMARY OF THE INVENTION

A power supply and associated method include a power supply converter having a power output and configured to provide a supply voltage through the power output to a communications device. A boost circuit is connected to the power supply converter in parallel but is isolated from the power supply converter's bulk input capacitance during normal operation. The boost circuit includes at least one power storage circuit and a charging circuit connected thereto and configured to charge and maintain the power storage circuit to a predetermined voltage and switch the power storage circuit into the power supply converter during an input undervoltage condition to transfer the stored power from the power storage circuit to the power supply converter thus maintaining the supply voltage to the communications device connected thereto for a required hold-up time.

In one aspect the power storage device comprises at least one reservoir capacitor.

In another aspect, the boost circuit comprises a comparator connected to the power supply input voltage and a reference voltage and configured to compare the power supply input voltage and reference voltage to determine the undervoltage condition. The boost circuit is configured to switch the power storage circuit into the power supply converter transferring the stored power from the power storage circuit to the power supply converter thus maintaining the supply voltage to the communications device connected thereto for the required hold-up time. In another aspect, the boost circuit is configured to disconnect the power storage circuit from the power supply converter and resume charging of the power storage circuit to the predetermined voltage if the input voltage rises to an acceptable operating point. The boost circuit, in another aspect, comprises a circuit configured to generate an undervoltage "dying gasp" alarm signal to the communications device during the start of an undervoltage condition.

In yet another aspect, the boost circuit is configured to derive it's PWM switching stimulus from the power supply converter. This PWM signal is used by the boost circuit in place of a dedicated boost power supply controller.

A method aspect is also set forth.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
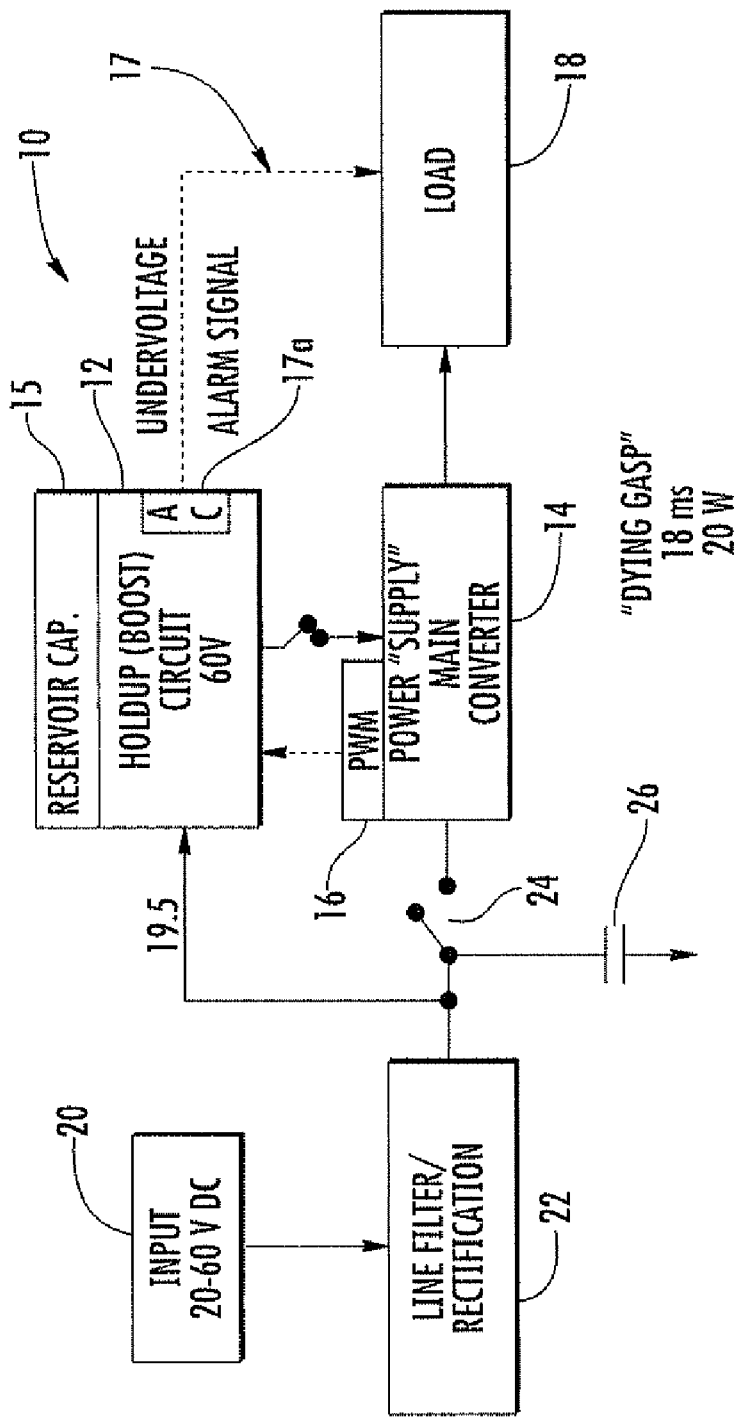
FIG. 1 is a high-level block diagram of a power supply and showing the boost circuit connected to a power converter and used to meet hold-up requirements for government or network regulations or protocols in accordance with a non-limiting example.

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

The power supply and method, in accordance with non-limiting examples, can be tailored to meet the hold-up requirements of government or network regulations or protocols. The circuit as described can be used in many different products, including various SHDSL products such as Total Access (TA) 1248, TA 838, NetVanta (NV) 838 and similar products manufactured by ADTRAN, INC. of Huntsville, Ala.

As noted before, there are various telecommunications standards such as the ITU 992.1 that require "dying gasp" messages to be sent by a DSL customer premises modem such as part of a Network Termination Unit (NTU) through a data connection to a central office device upon loss of power. These modems (or other devices) require uninterruptible power. This "dying gasp" also allows a message to have details of the imminent loss of power. In some communications systems, about 50 ms are required to complete the process of transmitting this "dying gasp" message although this time period can vary. Various xDSL technologies and Integrated Services Digital Network (ISDN) are required to support this "dying gasp." Some communications devices include a voltage supervisor that manages the power supply voltage and notifies the xDSL or ISDN chip set of a power loss. Unfortunately, some of these systems and devices have low efficiency, and as noted above, require an increased cost and PCB area to implement.

To solve this technical problem, the same amount of energy could be supplied during an undervoltage condition using less capacitance but starting the voltage decay from a much higher voltage, for example, 60 volts, which is a maximum input operating voltage in one example that has been addressed. This technical solution is realized using circuits that operate in conjunction with Equation 1, which takes into account the change in the energy in a capacitor when transitioning from one voltage to another. Therefore, the required capacitance decreases exponentially as the initial voltage is increased:

$$\Delta E = P_{Input} \cdot t_{Holdup} = \frac{1}{2} \cdot C \cdot (V^2_{Initial} - V^2_{Shutoff}) \qquad \text{(Equation 1)}$$

Having input capacitors charged to a higher voltage could have been achieved by using different techniques. One approach adds a regulated boost circuit in series with the input. While this is feasible, there are drawbacks to this technique. Adding components in series with the input of the power supply means having to size those components to be able to handle the full input current and therefore adds cost while decreasing the overall efficiency of the power supply.

Figure 2:
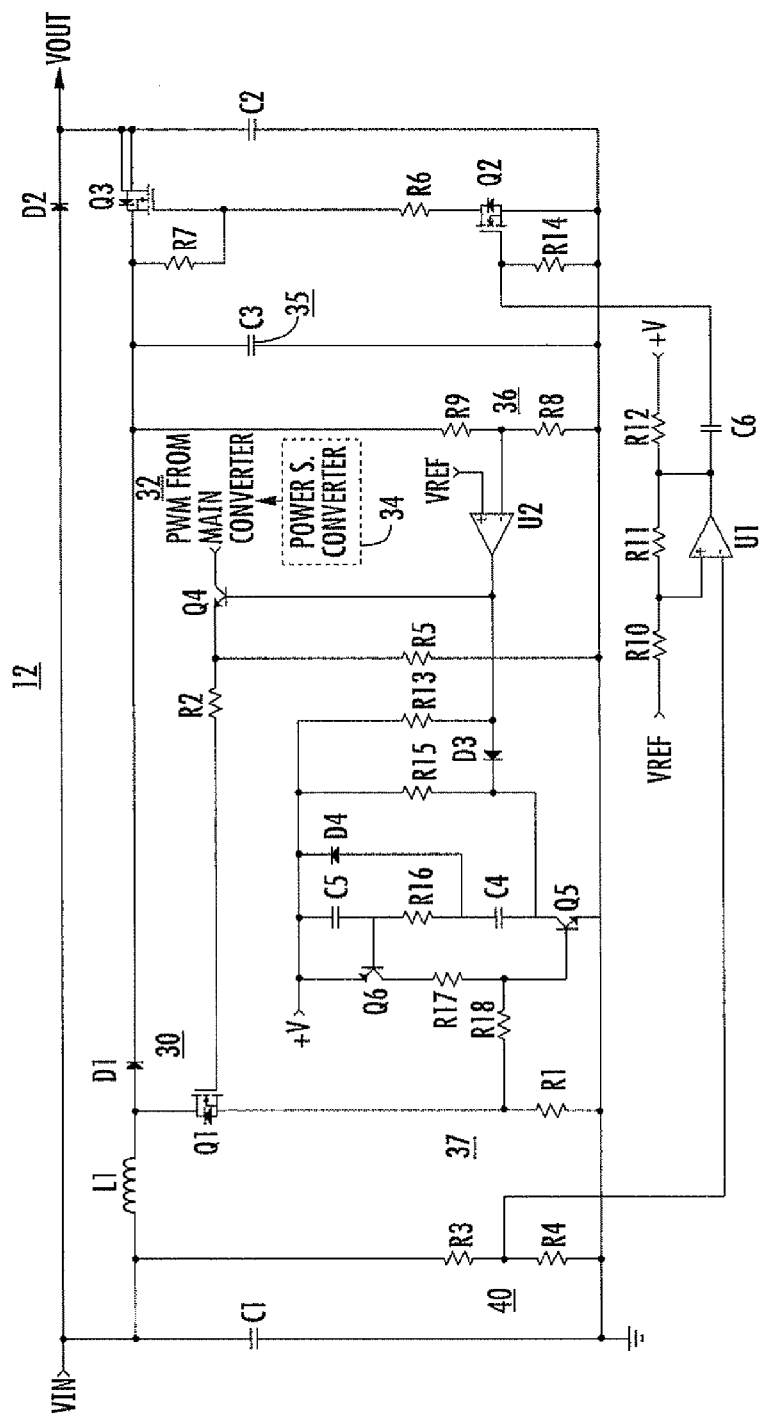
FIG. 2 is an example of a schematic circuit diagram that shows the boost circuit and related components in accordance with a non-limiting example.

These technical drawbacks are overcome by using the power supply in accordance with a non-limiting example as shown in FIGS. 1-2 where a hold-up boost circuit operates in parallel with any power supply main converter and acts as an energy reservoir and senses any undervoltage situation.

During normal operation, the power supply charges a power storage circuit, for example, a reservoir capacitor in one non-limiting example, to a high voltage and holds it. In the event of an undervoltage situation, the boost circuit releases the stored energy from the power storage circuit into the power supply converter until it is depleted. This technique, therefore, allows the charging components of the power supply, and more particularly the boost circuit, to be small and cost effective, while taking up relatively little space on a printed circuit board (PCB). Though there are currently some designs in the power supply industry that use a "paralleled reservoir" approach, the hold-up boost circuit as shown in FIGS. 1-2 is advantageous because it requires no additional or dedicated controller for charging. This power supply also does not require any post conversion once the power storage circuit, e.g., the reservoir capacitor, has been charged to its maximum value before being used by the power supply converter. As noted before, some power supply hold-up circuits require additional circuitry to reconvert the high-voltage energy in a reservoir capacitor back down to a lower voltage to be used by any main power converter. This is one extra conversion step. The power supply as will be described, in accordance with non-limiting examples, is able to do without the additional circuitry for reconverting high-voltage energy while also operating without a dedicated boost supply controller and therefore requires less parts, cost, and PCB area.

FIG. 1 is a high-level block diagram of the power supply 10, in accordance with a non-limiting example, that supplies power in a communications system during a power supply interruption. The power supply 10 includes a hold-up boost circuit 12 connected to the power supply "main" converter 14 (also termed power supply converter). This boost circuit 12 operates as a hold-up circuit and takes the input voltage of about 24 volts and boosts it up to 60 volts and holds it there until an input undervoltage condition is detected. A power storage circuit is formed in one example as a reservoir capacitor 15 as illustrated and associated with the boost circuit 12. A "dying gasp" alarm signal 17 is generated from an alarm circuit (AC) 17a at the boost circuit 12 to the load 18. A PWM (Pulse Width Modulated) signal 16 is taken from the power supply main converter 14 and drives the boost circuit 12 to generate 60 volts. This 60 volts potential is maintained by a trickle charge. When the input voltage falls below 20 volts, the trigger signal sends the 60 volts to the power supply converter 14. This holds the load 18 for a period of time to meet the necessary hold-up requirement. The power supply input 20 is typically about 20-60 volts DC and passed through the line filter/rectification circuit 22 before entering the power supply converter 14. A switch circuit 24 is located between the line/filter rectification circuit 22 and power supply converter 14 as illustrated. A grounded capacitor 26 is also illustrated as connected to the switch circuit 24. It should be understood that from 20 to 60 volts is a tripling of the voltage, but energy increase is ninefold, in accordance with Equation 1.

FIG. 2 is an example schematic circuit diagram showing the boost circuit 12 and its components that monitor a reference voltage and determine if it crosses a threshold. As a high-level general description for the circuit, a comparator activates a switch to transfer the energy in the reservoir capacitor to the power supply.

This boost circuit 12 reduces the number of input capacitors required to survive undervoltage situations, thus, reducing circuit costs and size. The boost circuit 12 does not require its own dedicated PWM controller to charge a power storage circuit, which in this example is at least one reservoir capacitor. It can switch the reservoir capacitor from the charging circuit to the power supply converter as required during undervoltage situations.

In operation, a reservoir capacitor is charged to a maximum voltage using the low power boost circuit that is driven from the power supply converter PWM signal. An input undervoltage situation is detected. Stored energy is transferred from the reservoir capacitor to the power supply converter without reconverting it or first stepping it back down. If the input rises back to an acceptable operating point, the reservoir capacitor is disconnected from the power supply converter and the reservoir capacitor 15 resumes charging to its maximum voltage.

A more detailed operational description using the schematic of the boost circuit of FIG. 2 now follows. The charging action is achieved by a charging circuit 30, which includes L1, Q1, D1, and operates with the reservoir capacitor C3. The switching stimulus is taken directly from the Pulse Width Modulated (PWM) signal 32 as generated in normal operation from the power supply converter, which is shown at block 34. This configuration eliminates the requirement for a separate, dedicated boost PWM controller. The reservoir capacitor C3, indicated generally at 35, will reach its target voltage regardless of the duty cycle of the power supply converter's PWM signal since, during normal operation, there is insignificant loading on C3. The voltage on C3 is monitored by a resistor divider 36 formed from R8 and R9, whose voltage is compared to a reference at U2, which dictates via Q4 whether the PWM signal should pass to Q1 and charge the reservoir capacitor C3. During normal operation, the comparator U2-Q4 provides negative feedback to maintain a predetermined maximum voltage on the reservoir capacitor C3.

To maintain inexpensive circuit design and keep it physically small, L1, Q1 and D1 are typically small. To accomplish this safely, the currents through these parts are limited by a current clamping circuit 37, which senses the current in Q1 via R1. When the Q1 current exceeds its threshold, Q5 turns on, which causes Q6 to turn on through C4 and R16. With Q6 conducting, Q5 is latched in the ON state for the remainder of the main converter's current PWM pulse as determined by the C4 and R1G network as illustrated. With Q5 latched in the conducting state, D3 conducts and turns Q4 off. As a result, Q1 turns off, thus resetting the current in Q1. This ensures the PWM signal from the power supply converter is a suitable switching stimulus for the boost supply regardless of the operating point of the power supply converter.

Undervoltage is determined by U1, which compares the input voltage through a resistor divider 40 (R3 and R4) to a reference voltage. When the resistor divider voltage falls below the reference, U1's output goes high and turns on Q2, which allows R6 and R7 to conduct. This biases Q3 and turns it ON. With Q3 on, C3 transfers its stored energy into the main power converter's bulk input capacitance, C2, providing the required hold-up energy for a predetermined amount of time. The value of capacitance needed for C3 is calculated using Equation 1 as noted above. D2 prevents C3 from transferring its stored energy back to the input.

With R10 and R11 providing hysteresis for the input voltage detection circuit, the input voltage rises further above the initial shutoff threshold in order to reset the output of U1. This prevents unwanted oscillations at the output of U1 and false input readings due to noise. If the input voltage rises above this new threshold, then the output of U1 will go low, turning off Q2 and Q3. This disconnects the reservoir capacitor, C3, from the power supply main converter and allows the boost charging circuit 30 by means of the main converter's PWM signal to continue charging C3 to its maximum value. The circuit is reset back into its initial state in normal operation.

To facilitate a graceful shutdown of the load during undervoltage situations, the output of U1 is monitored. Upon detection of an undervoltage condition, the load 18 begins shutting down so that all necessary operations are completed before the power supply main converter 14 exhausts the energy transferred from the boost circuit and shuts down.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A power supply comprising:
a power supply converter having a power output and configured to provide a supply voltage through the power output to a communications device; and
a boost circuit connected to the power supply converter in parallel and isolated from the power supply converter's bulk input capacitance during normal operation and further comprising at least one power storage circuit and charging circuit connected thereto and configured to charge and maintain the power storage circuit to a predetermined voltage and switch the power storage circuit into the power supply converter during an undervoltage condition to transfer the stored power from the power storage circuit to the power supply converter and maintain the supply voltage to the communications device connected thereto for a required hold-up time, wherein said power supply converter further comprises a circuit connected to the boost circuit and configured to generate a signal as a switching stimulus to the boost circuit to drive the boost circuit.

2. The power supply according to claim 1, wherein the power storage device comprises at least one reservoir capacitor.

3. The power supply according to claim 1, wherein the circuit comprises a Pulse Width Modulation (PWM) circuit.

4. The power supply according to claim 1, wherein said boost circuit comprises a comparator connected to a power supply input voltage and reference voltage and configured to compare the power supply input voltage and reference voltage and determine the undervoltage condition.

5. The power supply according to claim 1, wherein said boost circuit, upon detecting an input undervoltage condition, is configured to switch the power storage circuit into the power supply converter and transfer the stored power from the power storage circuit to the power supply converter and maintain the supply voltage to the communications device connected thereto for the required hold-up time.

6. The power supply according to claim 1, wherein said boost circuit comprises a circuit configured to generate an undervoltage alarm signal to the communications device during an undervoltage condition.

7. The power supply according to claim 5, wherein the boost circuit is configured to disconnect the power storage circuit from the power supply converter and resume charging of the power storage circuit to the predetermined voltage if the input voltage rises to an acceptable operating point.

8. A method for maintaining power to a communications load during a power supply interruption, comprising;
powering a communications load at a predetermined supply voltage from a power supply converter connected to the communications load;
maintaining a predetermined voltage at a boost circuit operating parallel to the power supply converter during normal operation;
switching the boost circuit into the power supply converter during an undervoltage condition to transfer the stored power from the boost circuit's reservoir capacitor to the power supply converter and maintain the supply voltage to the communications load for a required hold-up time; and
generating a signal as a switching stimulus from the power supply converter to drive the boost circuit.

9. The method according to claim 8, further comprising charging and maintaining at least one reservoir capacitor located at the boost circuit to a predetermined voltage.

10. The method according to claim 9, further comprising discharging the reservoir capacitor into the power supply converter during the undervoltage condition.

11. The method according to claim 10, further comprising disconnecting the reservoir capacitor from the power supply converter and resuming charging of the reservoir capacitor to the predetermined voltage if the input voltage rises to an acceptable operating point.

12. The method according to claim 8, further comprising determining the undervoltage condition by comparing a power supply input voltage to a reference voltage.

13. The method according to claim 8, further comprising using the power supply converter's Pulse Width Modulated (PWM) signal as the switching stimulus for the boost circuit.

14. The method according to claim 8, further comprising generating an undervoltage alarm signal to the communications load during the undervoltage condition.

15. The method according to claim 14, further comprising facilitating shutdown of the communications load upon receipt of the undervoltage alarm signal.

16. A power supply comprising:

a power supply converter having a power output and configured to provide a supply voltage through the power output to a communications device; and a boost circuit connected to the power supply converter in parallel and isolated from the power supply converter's bulk input capacitance during normal operation and further comprising at least one power storage circuit and charging circuit connected thereto and configured to charge and maintain the power storage circuit to a predetermined voltage and switch the power storage circuit into the power supply converter during an undervoltage condition to transfer the stored power from the power storage circuit to the power supply converter and maintain the supply voltage to the communications device connected thereto for a required hold-up time, wherein the power supply converter comprises a Pulse Width Modulation (PWM) circuit connected to the boost circuit and configured to share its PWM signal with the boost circuit and eliminate the need for a dedicated boost supply controller.

17. A method for maintaining power to a communications load during a power supply interruption, comprising;

powering a communications load at a predetermined supply voltage from a power supply converter connected to the communications load;

maintaining a predetermined voltage at a boost circuit operating parallel to the power supply converter during normal operation;

switching the boost circuit into the power supply converter during an undervoltage condition to transfer the stored power from the boost circuit's reservoir capacitor to the power supply converter and maintain the supply voltage to the communications load for a required hold-up time; and using the power supply converter's Pulse Width Modulated (PWM) signal as the switching stimulus for the boost circuit.

\* \* \* \* \*